David O. Hansen,
Neal L. Roy,
INVENTORS.

United States Patent Office 3,423,627
Patented Jan. 21, 1969

3,423,627
PARTICLE PARAMETER ANALYZING SYSTEM
David O. Hansen, Westminster, and Neal L. Roy, Redondo Beach, Calif., assignors to TRW Inc., Redondo Beach, Calif., a corporation of Ohio
Filed Jan. 28, 1966, Ser. No. 523,632
U.S. Cl. 315—22                                                      8 Claims
Int. Cl. H01j 29/70

ABSTRACT OF THE DISCLOSURE

X–Y plotter circuit apparatus which displays an input pulse representing particle parameter information, that would ordinarily appear on the screen of an oscilloscope as a rectangular pulse, as a single dot positioned on the screen where the upper right-hand corner of the input pulse would have appeared. If another event occurs such as impact of the particle with a target, and it is desired to display this event, apparatus is provided to replace the dot with a short horizontal line segment.

---

This invention relates generally to two dimensional particle analyzer circuits, and more particularly relates to an X–Y plotter circuit capable of use with an oscilloscope.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

Improvements in apparatus and techniques used with presently known electrostatic hypervelocity accelerators have enhanced their performance and increased their versatility. Particle detector preamplifiers also have been improved to the point that much higher velocity particles may be detected. In addition, high repetition rate particle injection systems are available for use in experiments requiring a large particle flux.

One disadvantage that has arisen from improved accelerator performance is that the increasing rate of data acquisition has necessitated more complex computational procedures than those originally used. In general, particle parameters were heretofore determined from arithmetical computations involving the amplitude and duration of the detector signal and other system variables. Although the calculations are straightforward, they are time consuming, and are not practical for large volumes of data. The particle parameter analyzing system of the present invention eliminates the above disadvantages.

The particle parameter analysis system of the present invention comprises essentially an electronic X–Y plotter. In this system each particle is represented by a point on a two-dimensional oscilloscope display. The displacement of the point along the Y axis is proportional to the charge on the particle, and the displacement in the X direction is proportional to its transit time through a particle detector. Since each particle is represented by a single point, rather than by a rectangular pulse as in previous oscilloscope displays, a large number of data points can be placed on a single display before confusion arises. Thus, briefly, in accordance with one embodiment of the present invention there is provided X–Y plotter circuit apparatus whereby an input pulse representing particle parameter information by means of its height and duration, that would ordinarily appear on the screen of an oscilloscope as a rectangular pulse, is replaced by a single dot which appears at the place on the screen where the upper right-hand corner of the rectangular input pulse would have appeared. Moreover, if another event occurs, such as impact of the particle with a target, within a predetermined time period, and it is desired to record or display this event, the dot can be replaced by a short horizontal line segment in other embodiments of the invention.

Accordingly, one object of the present invention is the provision of particle analyzing apparatus capable of representing certain parameters of a particle, such as charge and transit time through a detector, as a single point on an oscilloscope display screen.

Another object of the present invention is the provision of particle parameter analyzing apparatus capable of displaying a large number of data points on a single display.

One other object is the provision of particle analyzing apparatus which is not only capable of displaying a representation of certain parameters of a particle, such as charge and transit time through a detector, but is also capable of displaying the occurrence of another event, such as collision of the particle with a target.

These and other objects will be more clearly apparent when taken in consideration with the following detailed description and drawings wherein.

Figure 3A:
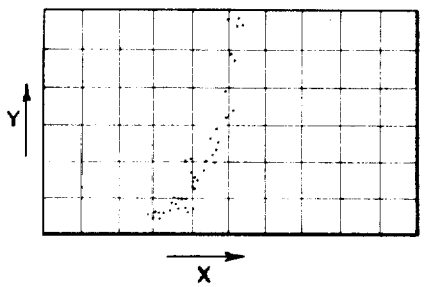
Figure 3B:
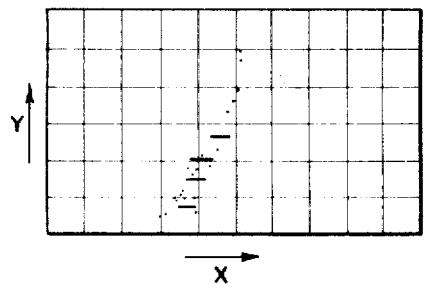
Figure 4:
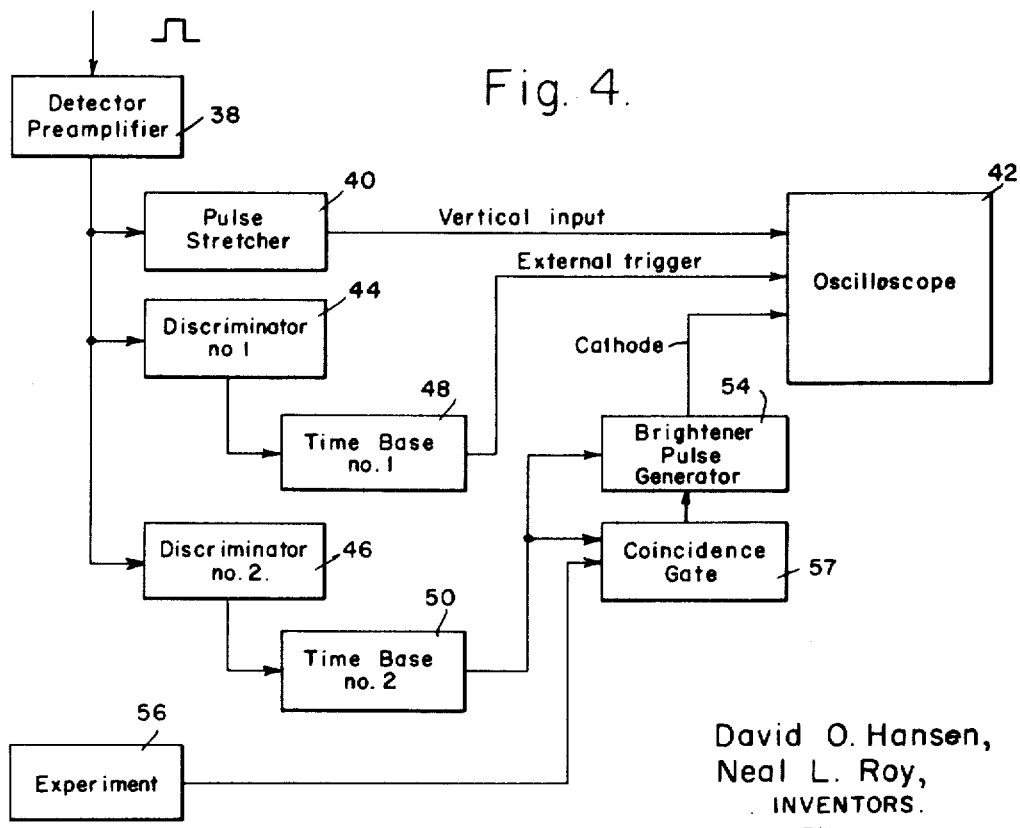

FIGS. 3(a) and 3(b) are displays to be found on the cathode ray tube of an oscilloscope in accordance with the present invention; and FIG. 4 is a block diagram showing of still another embodiment of the invention.

Figure 1:
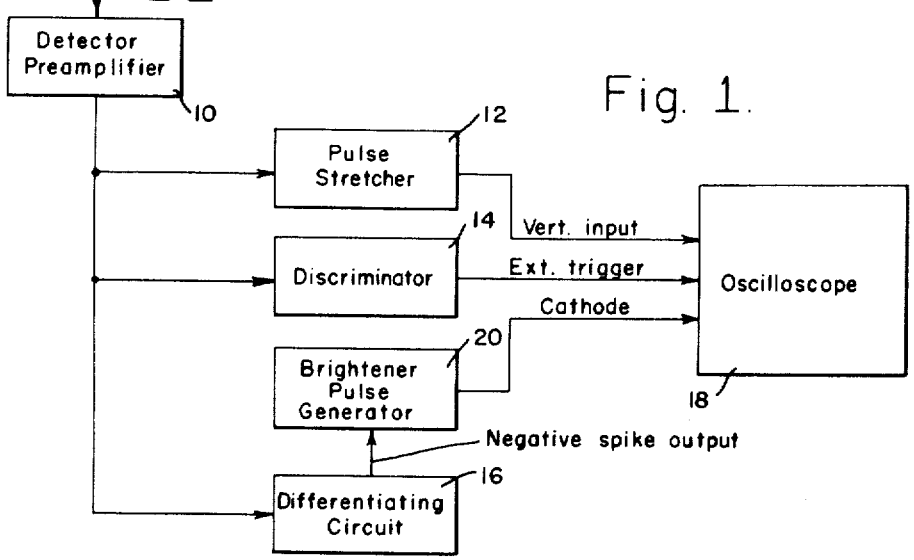
FIG. 1 is a block diagram showing of one embodiment of the invention.

Referring to FIG. 1 wherein one embodiment of the X–Y plotter circuit of the present invention is shown, an information input pulse from a particle detector (not shown) is fed through a detector preamplifier 10 to a pulse stretcher 12, a discriminator 14, and a differentiating circuit 16. The pulse stretcher 12 generates a stretched pulse which has the same amplitude as the rectangular information pulse from the preamplifier 10 but is much longer in time duration. The stretched pulse is then applied to the vertical plate input circuit of an oscilloscope 18, wherein the oscilloscope electron beam is deflected vertically by an amount equal to the height or amplitude of the information pulse from the preamplifier 10.

At the same time that the stretched pulse is applied to the vertical plate circuit of the oscilloscope 18, the discriminator 14 produces a trigger pulse to the horizontal plate sweep circuit of the oscilloscope when the information pulse exceeds a predetermined threshold.

The information pulse is also fed to the differentiating circuit 16 which produces a positive pulse that is generated at a time coincident with the leading edge of the information pulse, and a negative pulse which occurs at a time coincident with the trailing edge of the information pulse. The negative pulse from the differentiating circuit 16 is applied to a brightener pulse generator 20 which produces in its output a short duration, rectangular voltage pulse to the cathode of the oscilloscope 18. The brightener pulse generator 20 can be a conventional one-shot multivibrator or the like. In actual operation the beam intensity control (not shown) of the oscilloscope 18 is adjusted so that a trace is visible on the cathode ray screen of the oscilloscope only when the brightening pulse from the brightener pulse generator 20 is applied to the oscilloscope cathode. It will be appreciated that since brightening of the oscilloscope screen occurs at a time coincident with the trailing edge of the information pulse and, at the same time, the vertical displacement of the oscilloscope electron beam is proportional to the height of the information pulse, the position of a brightened spot provides the desired particle parameter information.

Figure 2:
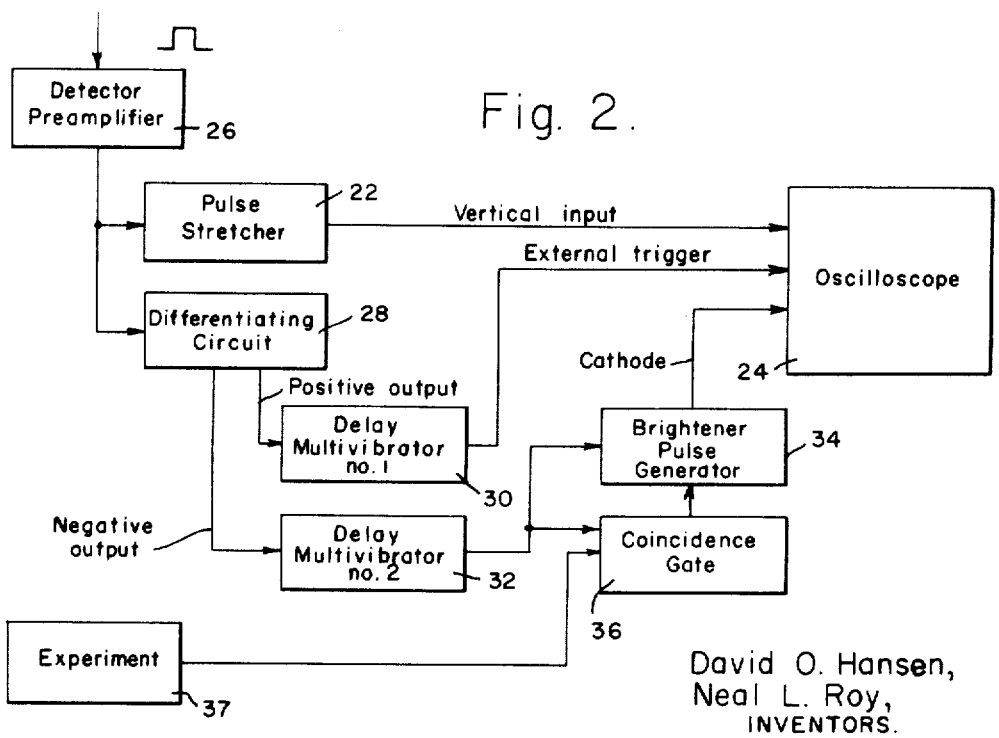
FIG. 2 is a block diagram showing of another embodiment of the invention.

A further feature makes provision for the display of experimental information regarding the effect of particle impact after the particle has passed through the particle detector (not shown). Generally this feature is restricted to a simple "yes-no" type of response. A second embodiment of this invention for implementing this response is shown in FIG. 2. The stretched pulse from a pulse stretcher 22 is applied to the vertical input of an oscilloscope 24 after an information pulse passes through a detector preamplifier 26, as in the first embodiment, but output pulses from a differentiating network 28 are applied to two one hundred microsecond duration delay multivibrators 30 and 32. The first of these multivibrators 30 is triggered by the positive pulse from the differentiating network 28 corresponding to the leading edge of the information pulse from the preamplifier 26, while the second multivibrator 32 is triggered by the negative pulse which occurs at the trailing edge of the information signal. The trailing edge of the output pulse from the first multivibrator 30 is used to trigger the horizontal sweep circuit of the oscilloscope 24. The pulse from the second multivibrator is fed to a brightener pulse generator 34 and a coincidence gate 36. The brightener pulse generator 34 can be a one-shot multivibrator with two time constants; the time constant that is actually used is determined by the coincidence gate 36, which is triggered by a signal from an experiment 37. If no input is provided to the gate 36, the trace on the screen of oscilloscope 24 becomes brightened in exactly the same manner as described in the first embodiment by the production of a short duration brightener pulse from the brightener pulse generator 34, as determined by one of the heretofore mentioned time constants of the multivibrator, except that there is a one hundred microsecond delay in the generation of the pulse.

The "yes-no" feature is characterized by changing the duration of the brightener pulse from circuit 34. This is accomplished when a second information pulse from the experiment 37, which represents impact of the particle on a target, is applied to the coincidence gate 36. If the second pulse appears before the completion of the pulse from multivibrator 32, the gate 36 is opened and the brightener pulse from the pulse generator 34 is rendered several times longer, depending on the second time constant, than if the second pulse had not appeared. This results in points being plotted on the screen of oscilloscope 24 for "no" events as in FIG. 3(a) for no impacts and short lines being recorded for "yes" events as in FIG. 3(b) when impacts occur. The analysis of particle parameters would be the same in any case. As can be seen, this feature is most useful in experiments which are conducted on the initiation of voltage breakdown by particle impacts with targets.

Referring to FIG. 4 wherein there is shown still another embodiment of the invention, the rectangular information pulse from a particle detector (not shown), is applied to a pre-amplifier 38, a pulse stretcher 40, and then to the vertical input circuit of an oscilloscope 42, as in the previous embodiments. Simultaneously the input signal is applied to a first and second similar discriminators 44 and 46. The first discriminator 44 fires at a predetermined set level on the leading edge of the input pulse to produce a trigger pulse to a first time base generator 48. The second discriminator 46 fires on the trailing edge of the input pulse and generates a trigger pulse to a second time base generator 50.

Both the time base generators 48 and 50 can be delay multivibrators which produce delayed pulses similar to the pulses produced by the multivibrators 30 and 32, and delayed, for example, a similar period of one hundred microseconds.

The output pulse from the time base 48 is applied to the horizontal sweep circuit of the oscilloscope 42 and the output pulse from the time base 50 is applied to a brightener pulse generator circuit 54 and a coincidence gate 57 which could be similar to the brightener pulse generator circuit 34 and coincidence gate 36, respectively, of the previous embodiment of FIG. 2. Similarly the brightener pulse generator 54 produces a brightener pulse of short duration which pulses the cathode of the oscilloscope 42, as in the previous embodiment. If a second information pulse is received from an experiment source 56 before the pulse from time base generator 50 is completed and applied to the coincidence gate 57, which is opened, the brightener pulse from pulse generator 54 is lengthened a predetermined time. As before, points are plotted on the screen of oscilloscope 42 for "no" events as in FIG. 3(a), and short lines for "yes" events as in FIG. 3(b).

It will be appreciated that the apparatus of the embodiment of FIG. 4 can be modified to eliminate the capability of displaying dots or lines simply by removing the two time bases 48 and 50 from the circuit. In that event, of course, the displays will be conventional squarewave displays of particle collisions and parameters.

It will also be appreciated that display of data by the apparatus of the present invention can be recorded photographically and the amount of data that can be distinguished in each photograph is increased by several orders of magnitude. The device of the present invention produces results equivalent to results produced by previous multichannel pulse height analyzers, and provides the added advantage that "yes" or "no" indications can be shown on a two-dimensional photographic display.

Changes can be made in the combination and steps and procedures, as well as parts or elements, as heretofore set forth in the specification and shown in the drawings without departing from the spirit and scope of the invention as defined in the following claims.

The embodiments of the invention in which an exclusive property or privilege is claimed are defined as follows:

1. Apparatus of the type described comprising:
   means responsive to an information input pulse for generating an output pulse to be applied to the vertical plate circuit of an oscilloscope, said output pulse having an amplitude equal to and a time duration greater than that of said information input pulse,
   means responsive to said information input pulse for generating first and second pulses having leading edges time coincident with the leading and trailing edges of said input pulse, respectively, said first pulse being adapted for application to the horizontal plate sweep circuit of the oscilloscope, and
   means responsive to said second pulse for generating a brightener pulse to be applied to the cathode circuit of the oscilloscope.

2. Apparatus as set forth in claim 1, said first and second pulse generating means comprising:
   discriminator means for generating said first pulse when said input pulse exceeds a predetermined amplitude, and
   differentiator circuit means for differentiating said input pulse to generate a pair of positive and negative pulses, said negative pulse being said second pulse and time coincident with the trailing edge of said input pulse.

3. Apparatus as set forth in claim 1, said first and second pulse generating means comprising:
   differentiator circuit means for differentiating said input pulse to generate a pair of positive and negative pulses, and
   first and second pulse generators responsive to said positive and negative pulses, respectively, for generating delayed first and second pulses.

4. Apparatus as set forth in claim 3, said first and second pulse generators comprising one-shot multivibrators, respectively, for generating said delayed first and second pulses.

5. Apparatus as set forth in claim 3, wherein said brightener pulse generator means comprises:
- a one-shot multivibrator having first and second time constants, said one-shot multivibrator being normally responsive to said second pulse to generate said brightener pulse having a short time duration as determined by said first time constant, and
- a gate adapted to be opened by a second information pulse occurring before completion of said second pulse to generate said brightener pulse having a longer time duration as determined by said second time constant.

6. Apparatus as set forth in claim 1, said first and second pulse generating means comprising:
- first discriminator means responsive to the leading edge of said input pulse for generating a first trigger pulse when said input pulse exceeds a predetermined amplitude,
- second discriminator means responsive to the trailing edge of said input pulse for generating a first trigger pulse when said input pulse exceeds a predetermined amplitude, and
- first and second pulse generators responsive to said first and second trigger pulses, respectively, for generating delayed first and second pulses.

7. Apparatus as set forth in claim 6, said first and second pulse generators comprising time base generators for generating said delayed first and second pulses.

8. Apparatus as set forth in claim 6, wherein said brightener pulse generator means comprises:
- a one-shot multivibrator having first and second time constants, said one-shot multivibrator being normally responsive to said second pulse to generate said brightener pulse having a short time duration as determined by said first time constant, and
- a gate adapted to be opened by a second information pulse occurring before completion of said second pulse to generate said brightener pulse having a longer time duration as determined by said second time constant.

References Cited

UNITED STATES PATENTS 2,830,227   4/1958   Hasbrook _____ 315—22

RODNEY D. BENNETT, *Primary Examiner.*

T. H. TUBBESING, *Assistant Examiner.*

U.S. Cl. X.R.

315—25; 324—121